March 14, 1972   J. D. SINE   3,649,368
MEASURING APPARATUS
Filed Dec. 18, 1968
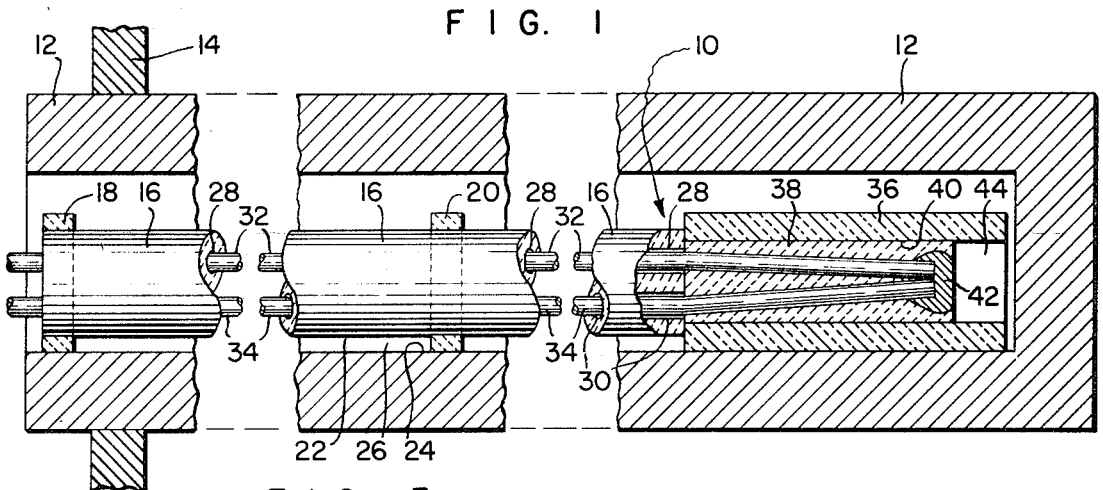
FIG. 1
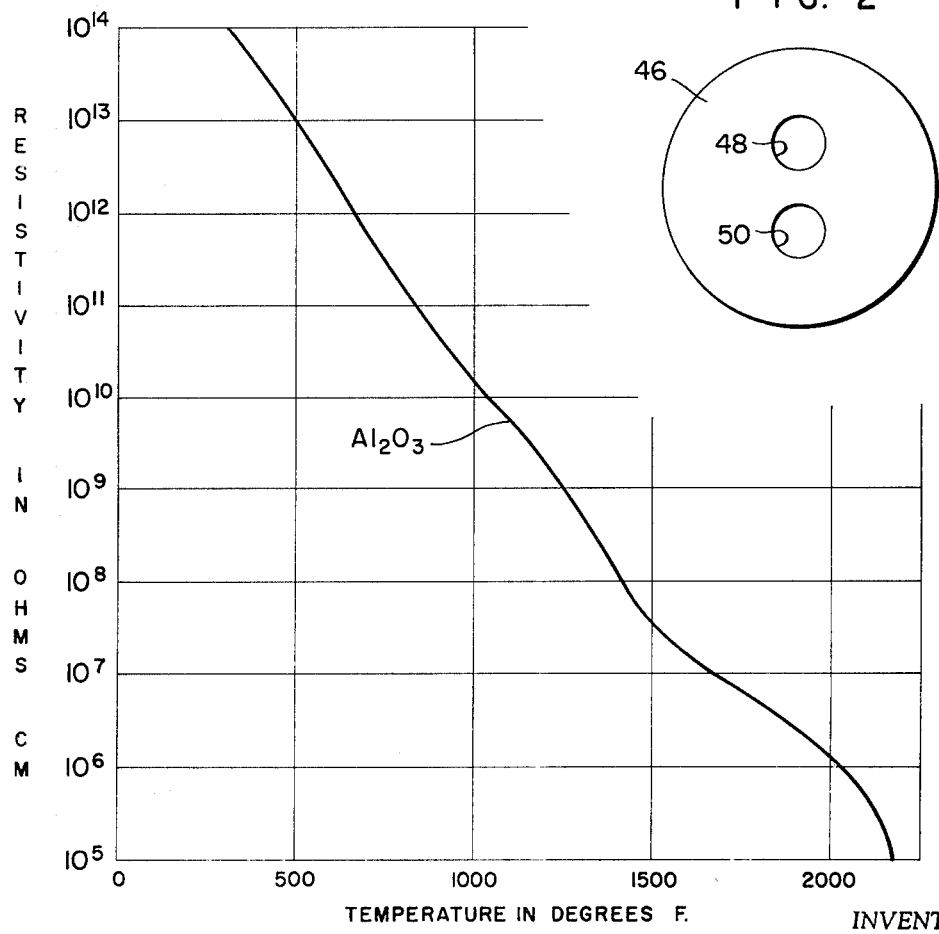
FIG. 3
FIG. 2
INVENTOR.
JOSEPH D. SINE
BY
John Shaw Stevenson
AGENT.

United States Patent Office 3,649,368
Patented Mar. 14, 1972

3,649,368
MEASURING APPARATUS
Joseph D. Sine, Sellersville, Pa., assignor to
Honeywell, Inc., Minneapolis, Minn.
Filed Dec. 18, 1968, Ser. No. 784,588
Int. Cl. H01v 1/04
U.S. Cl. 136—232                            7 Claims

ABSTRACT OF THE DISCLOSURE

To enable a thermocouple-current transmitter to provide an accurate temperature measurement under varying high temperature conditions there is disclosed herein an apparatus which will prevent leakage of current from its thermocouple element through an associated protecting well to ground.

---

It is an object of the present disclosure to provide a unique insulated construction for a thermocouple element in a thermocouple to current transmitter circuit that will provide the required resistance to ground, during varying high temperature sensing conditions.

It is another object of the present disclosure to provide an effective and inexpensive construction for a thermocouple element for isolating it from ground instead of following the more costly present day practice of isolating the current transmitter that is associataed with this thermocouple from ground.

A better understanding of the invention may be had from the following detailed description when read in connection with the accompanying drawings in which:

FIG. 1 shows the aforementioned improved insulator construction for a thermocouple.

FIG. 2 shows a disc that can be used in lieu of the ring shaped insulator portions shown in FIG. 1.

FIG. 3 illustrates the undesired drop in insulator resistance that normally takes place in conventional insulating materials and shows how the resistivity of these materials are lowered as the temperature of these materials increases.

Referring now to the drawing in more detail there is shown in FIG. 1 a thermocouple element 10, a protecting well 12 and a grounded support 14.

The thermocouple element 10 is comprised of a elongated insulator 16 which is preferably made of a cylindrical shaped configuration and of a material e.g. aluminum oxide that posesses good high temperature electrical insulating qualities.

The external elongated surface of the insulator 16 has a desired suitable number of ring shaped collars e.g. collars 18, 20 slidably positioned in spaced apart relation thereon. These collars 18, 20 are constructed of a high temperature resistive oxide material, such as aluminum oxide, and are held in the position shown in FIG. 1 by a suitable refractory electrical insulating cement. The insulating cement is inserted between the inside wall of each collar 18, 20 and the external surface 22 of the insulator 16.

The external surface of each of the collars 18, 20 are shown in physical freely movable contact with the internal wall surface 24 of the metallic protecting tube 12. The collars 18, 20 thus provide a means whereby an air gap 26 is formed between the outer surface of the insulator 22 and the inner wall surface of the protecting well that extends between each of the adjacent pair of collars 18, 20.

A pair of spaced apart apertures 28, 30 are shown in FIG. 1 extending through the entire length of the elongated insulator 16 to accommodate the loose passage of their associated thermocouple wires 32, 34 therethrough.

The angularly displaced right ends of the thermocouple wires 32, 34 are shown extending beyond the elongated insulator 16 and into a sleeve 36 that possesses the same outside diameter as the collars 18, 20 and which is made of the same kind of high temperature resistive oxide material as these collars.

The angularly displaced right ends of the thermocouple wires 32, 34 are retained in fixed relation with the insulating sleeve 36 by means of a suitable refractory electrical insulating cement 38 that fills the space formed by the inner wall surface 40 of this sleeve 36 and which extends up to but which does not cover a hot junction portion 42 formed at the extreme right end of the thermocouple wires 32, 34.

From the aforementioned description it can be seen that an air gap 44 is purposely formed in the inner right end of the sleeve so that this air gap together with the small end surface of the insulating sleeve 36 will maintain a high electrical insulating resistance between the hot junction end 42 and the electrically conductive protecting well 12.

FIG. 2 shows a wafer 46 having apertures 48, 50 therein for accommodating the free passage of the thermocouple wires 32, 34 shown in FIG. 1 therethrough. This wafer 46 has the same outside diameter and approximately the same thickness as the collar 20 shown in FIG. 1.

The wafer 46 can be used as electrical insulation to prevent grounding of the thermocouple wire similar to that previously described for the collars 18, 20 shown in FIG. 1. This can be done by making the elongated insulator 16 of a multi part construction rather than the single piece construction shown in FIG. 1 and by alternately threading these multi insulator parts and a wafer 46 in succession over the thermocouple wires 32, 34.

The aforementioned described thermocouple assembly 10 can be beneficially employed for use in present day thermocouple to current transmitters such as is disclosed in the Edward T. E. Hurd III patent application, Ser. No. 670,822, filed Sept. 8, 1967, now Pat. No. 3,562,729.

In order to prevent an erroneous temperature measurement from being transmitted by any one of these present day solid state transmitters it is necessary that current leakage from the thermocouple element 10 to the protecting well 12 be kept at a minimum value. If such a current leak does occur this will result in an undesired voltage being created in the transmitter thermocouple measuring loop which in turn will produce an erroneous temperature measurement. The apparatus disclosed herein solves this current leakage problem by:

(a) Providing a highly effective resistive air gap 26 formed by means of the spaced apart rings 18, and 20 or 46, 46 and by allowing only a small area of physical contact between the thermocouple element 10 and the protecting well 12 and (b) Providing a highly effective resistive air gap 44 formed at the right end of a sleeve 36.

The embodiments of the invention in which an exclusive property or privilege is claimed are defined as follows:

1. An apparatus to substantially eliminate leakage of current to ground from a thermocouple assembly through a grounded electrically conductive protecting well that surrounds the assembly, said thermocouple assembly being comprised of two elongated spaced apart thermocouple wires extending along a longitudinal axis and surrounded by insulating material of a substantially cylindrical configuration, said insulating material surrounding said thermocouple wires having spaced apart insulating substantially ring shaped collar portions positioned thereon along said longitudinal axis and in spaced apart contact with a portion of the inner wall surface of the protecting well to form air insulating gaps between said insulating material and the inner wall surface of the well, said collar portions having an outer diameter substantially smaller than the inner diameter of said well, and wherein said wires provide a hot junction spaced from the inner wall surface and the inner closed end of said well.

2. The apparatus defined in claim 1 wherein the insulating material surrounding said wires is of a cylindrical configuration and wherein each of the spaced apart collar portions surrounds the thermocouple wires are formed from a plurality of wafer shaped insulator discs to minimize contact and provide maximum insulator resistance between said wires and said electrically conductive protecting well.

3. The apparatus defined in claim 1 wherein said thermocouple wires are each joined at one of their associated ends to form an exposed hot junction portion at a position that is spaced inwardly from the inner end wall surface of said protecting well that forms its closed end and at a position that is spaced inwardly and away from an end of an insulator sleeve that is within the closed end of said well and which surrounds and extends about said longitudinal axis in opposite directions away from said exposed hot junction, electrical insulating cement positioned to cover the last mentioned thermocouple wire portions and the remaining portion of said hot junction to retain said last two mentioned portions in fixed relation with said insulating sleeve and said portion of said sleeve extending away from said exposed hot junction providing an air gap resistivity barrier between said hot junction end of said thermocouple wire and said grounded protecting well.

4. The apparatus defined in claim 1 wherein said thermocouple wires are joined to form a hot junction having an exposed end portion at a position that is spaced inwardly from the closed inner wall surface of the protecting well and inwardly from an end of an insulating sleeve that is positioned to extend along an inner wall of said well electrical insulating cement covering the remaining portion of said hot junction and portions of the thermocouple wire extending therefrom to retain said last mentioned thermocouple portions in fixed relation with said insulator sleeve, and said open end portion of the sleeve forming an air space that extends away from a position adjacent the exposed end of the hot junction toward the inner wall of a protecting well providing an air gap resistivity barrier between said hot junction thermocouple wire and said grounded protecting well.

5. The apparatus as defined in claim 1 wherein the insulating material surrounding said wires have spaced apart apertured wall portions formed therein to accommodate the loose passage of a different one of the two thermocouple wires therethrough.

6. The apparatus as defined in claim 1 wherein the protecting well is constructed of a metallic material and the insulating material is high temperature refractory insulating material.

7. The apparatus as defined in claim 1 wherein the insulating material and the spaced apart insulating collar portions provide an elongated air gap having a higher resistivity than said insulating material that surrounds said thermocouple wires.

References Cited
UNITED STATES PATENTS

| | | | |
|---|---|---|---|
| 2,177,033 | 10/1939 | Buell | 136—232 |
| 2,318,479 | 5/1943 | Gillis | 136—230 X |
| 2,430,887 | 11/1947 | Ray | 136—217 X |
| 2,445,159 | 7/1948 | Tegge | 136—230 |
| 2,820,839 | 1/1958 | Schunke | 136—231 |
| 2,870,233 | 1/1959 | Comer | 136—231 X |
| 2,915,575 | 12/1959 | Thomas | 136—223 |
| 3,263,502 | 8/1966 | Springfield | 136—230 X |
| 3,395,051 | 7/1968 | Pisarz | 136—233 |
| 3,477,122 | 11/1969 | Hamrick | 29—573 |

FOREIGN PATENTS

| | | | |
|---|---|---|---|
| 7,910 | 6/1908 | Great Britain | 136—232 |
| 461,370 | 2/1937 | Great Britain | 136—230 |
| 1,027,909 | 4/1958 | Germany | 136—230 |

BENJAMIN R. PADGETT, Primary Examiner

H. E. BEHREND, Assistant Examiner